United States Patent
Ma et al.

(10) Patent No.: US 12,292,887 B2
(45) Date of Patent: *May 6, 2025

(54) COLUMNAR CACHE QUERY USING HYBRID QUERY EXECUTION PLAN

(71) Applicant: Google LLC, Mountain View, CA (US)

(72) Inventors: Xiaobin Ma, Fremont, CA (US); Xun Cheng, Dublin, CA (US); Viral Shah, Cupertino, CA (US); Anjan Kumar Amirishetty, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,490

(22) Filed: Aug. 24, 2023

(65) Prior Publication Data
US 2023/0401209 A1  Dec. 14, 2023

Related U.S. Application Data

(63) Continuation of application No. 17/521,213, filed on Nov. 8, 2021, now Pat. No. 11,782,921.

(51) Int. Cl.
*G06F 16/2452* (2019.01)
*G06F 16/245* (2019.01)
*G06F 16/2453* (2019.01)
*G06F 16/2455* (2019.01)

(52) U.S. Cl.
CPC .. *G06F 16/24542* (2019.01); *G06F 16/24524* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 9,058,357 B1 * | 6/2015 | Birnbaum | G06F 16/21 |
| 2003/0018618 A1 * | 1/2003 | Bestgen | G06F 16/24545 |
| 2004/0220923 A1 * | 11/2004 | Nica | G06F 16/24544 |
| 2009/0259644 A1 * | 10/2009 | Scheuermann | G06F 16/24542 |
| 2014/0149356 A1 * | 5/2014 | Agarwal | G06F 16/27 |
| | | | 707/652 |

(Continued)

OTHER PUBLICATIONS

Rivenes, A., "Columnar Formats in Exadata Flash Cache", Oracle Database in-Memory, Oct. 30, 2017, retrieved from the internet <https://blogs.oracle.com/in-memory/post/columnar-formats-in-exadata-flash-cache>, 3 pages.

(Continued)

*Primary Examiner* — Son T Hoang
(74) *Attorney, Agent, or Firm* — Lerner David LLP

(57) ABSTRACT

A hybrid query execution plan is generated for executing queries on database systems implementing a columnar cache. A hybrid query execution plan combines a query execution plan for querying and retrieving data from a columnar cache and a base table. A columnar cache stores cached data in column-major format, which is logically represented by the database management system in row-major format. A database management system as described herein can scan valid blocks of column data according to a column scan operation. The system can identify invalidated blocks and execute a different sub-execution plan of the hybrid query execution plan to scan corresponding rows in tables corresponding to the location of data for the invalidated blocks.

16 Claims, 6 Drawing Sheets

(56) References Cited

U.S. PATENT DOCUMENTS

| | | | | |
|---|---|---|---|---|
| 2017/0371926 A1* | 12/2017 | Shiran | ............... | G06F 16/24542 |
| 2019/0220464 A1* | 7/2019 | Butani | .............. | G06F 16/24542 |
| 2019/0361916 A1* | 11/2019 | Weaver | ................... | G06F 16/00 |
| 2020/0210398 A1* | 7/2020 | Liu | ......................... | G06F 16/22 |
| 2021/0209088 A1* | 7/2021 | Zheng | ................. | G06F 16/2455 |
| 2023/0117461 A1* | 4/2023 | Pasupuleti | .......... | G06F 16/2453 |
| | | | | 707/721 |

OTHER PUBLICATIONS

"Columnar and Row-Based Data Storage", SAP Help Portal, retrieved from the internet on Nov. 8, 2021<https://help.sap.com/viewer/ 6b94445c94ae495c83a19646e7c3fd56/2.0.01/en-US/ bd2e9b88bb571014b5b7a628fca2a132.html>, 5 pages.

Ma et al. Segment access-aware dynamic semantic cache in cloud computing environment. Journal of Parallel and Distributed Computing, vol. 110, Dec. 31, 2017 (Dec. 31, 2017).

Ren et al. Semantic caching and query processing. IEEE Transactions on Knowledge and Data Engineering, IEEE Service Centre, Los Alamitos, CA, US, vol. 15, No. 1, Jan. 1, 2003 (Jan. 1, 2003), pp. 192-210.

Sumalatha et al. Dynamic Rule Set Mapping Strategy for the Design of Effective Semantic Cache. Toward Network Innovation Beyond Evolution: the 9th International Conference on Advanced Communication Technology; ICACT 2007; Phoenix Park, Korea, Feb. 12-14, 2007; Proceedings, IEEE, Technical Activities, Piscataway, NJ, USA, Feb. 1, 2007 (Feb. 1, 2007), pp. 1952-1957.

International Search Report and Written Opinion for International Application No. PCT/US2022/048578 dated Feb. 21, 2023. 17 pages.

\* cited by examiner

COLUMNAR CACHE QUERY USING HYBRID QUERY EXECUTION PLAN

CROSS-REFERENCE TO RELATED APPLICATION

The present application is a continuation of U.S. patent application Ser. No. 17/521,213 filed on Nov. 8, 2021, the disclosure of which is incorporated herein by reference.

BACKGROUND

A database management system (DBMS) is a system for managing one or more databases, and for receiving and resolving queries to the managed database(s). A DBMS can manage one or more tables or relations of data stored on one or more storage devices and forming part of one or more managed databases. The DBMS can read and write to individual rows or columns of the managed tables, including updating, deleting, and adding records.

A DBMS can implement a cache for temporarily storing database data. The cache can store blocks of data representing rows of a base database table. A cached block is invalidated when corresponding blocks of the base table from which the cache block is retrieved are modified after caching the block. The invalidated block no longer reflects the data updated in the base table from which the data is cached.

BRIEF SUMMARY

Aspects of the disclosure are directed to generating and executing hybrid query execution plans for a database management system (DBMS) implementing a columnar cache. The DBMS generates a hybrid query execution plan of two or more separate plans for retrieving data in a columnar cache storing one or more columns of data. During a scan of the cache, the DBMS determines valid and invalidated data in the cache and performs operations according to a respective execution plan, depending on the validity of the data. Aspects of the disclosure include generating query execution plans based on predicted cost-tradeoffs in applying different hybrid query execution plans for query execution, to apply the estimated higher-performing plan, given the state of data in a columnar cache.

Aspects of the disclosure provide for a system having one or more processors configured to: one or more processors configured to: receive a query for data in a columnar cache, the columnar cache including one or more columns of data of tables of a database, each column including one or more blocks of data; and in response to receiving the query, receive a hybrid query execution plan specifying a plurality of operations across a plurality of sub-execution plans, which, when executed by the one or more processors, causes the one or more processors to generate query results in response to the query, wherein the hybrid query execution plan includes: a first sub-execution plan including one or more first operations to scan valid blocks in the columnar cache, and a second sub-execution plan including one or more second operations to scan invalidated blocks in the columnar cache.

Aspects of the disclosure provide for one or more non-transitory computer-readable storage media encoding instructions that when executed by one or more processors, cause the one or more processors to perform operations including: receiving a query for data in a columnar cache, the columnar cache including one or more columns of data of tables of a database, each column including one or more blocks of data; and in response to receiving the query, receiving a hybrid query execution plan specifying a plurality of operations across a plurality of sub-execution plans, which, when executed by the one or more processors, causes the one or more processors to generate query results in response to the query, wherein the hybrid query execution plan includes: a first sub-execution plan including one or more first operations to scan valid blocks in the columnar cache, and a second sub-execution plan including one or more second operations to scan invalidated blocks in the columnar cache.

Aspects of the disclosure provide for a computer-implemented method, including: receiving, by one or more processors, a query for data in a columnar cache, the columnar cache including one or more columns of data of tables of a database, each column including one or more blocks of data; and in response to receiving the query, receiving, by the one or more processors, a hybrid query execution plan specifying a plurality of operations across a plurality of sub-execution plans, which, when executed by the one or more processors, causes the one or more processors to generate query results in response to the query, wherein the hybrid query execution plan includes: a first sub-execution plan including one or more first operations to scan valid blocks in the columnar cache, and a second sub-execution plan including one or more second operations to scan invalidated blocks in the columnar cache.

Aspects of the disclosure can include one or more features, including one or more features described below. In some examples, aspects of the disclosure provide for all of the following features, in combination.

The one or more processors are further configured to, in response to receiving the query: execute the one or more first operations to scan valid blocks in the columnar cache, wherein while executing the one or more first operations, identify invalidated blocks in the columnar cache; and execute the one or more second operations to scan only rows of a base table corresponding to the identified invalidated blocks.

The one or more first operations include operations to perform a columnar cache scan when executed by the one or more processors, and wherein the one or more second operations include operations to perform a row store scan when executed by the one or more processors.

The row store scan is one of: a sequential scan, an index scan, an index only scan, or a bitmap scan; and wherein, when the row store scan is executed by the one or more processors, the one or more processors are configured to scan only rows of a base table corresponding to identified invalidated blocks.

The row store scan is an index scan, and each invalidated block includes a respective row identifier identifying a row in a table of the database of which the block is stored; and wherein in executing the one or more second operations in accordance with the row store scan to scan only the identified invalidated blocks, the one or more processors are further configured to scan each of one or more rows of a table of the database after determining that a respective row identifier for the row matches a respective row identifier for at least one of the invalidated blocks.

The row store scan is a sequential scan; and wherein in executing the one or more second operations in accordance with the row store scan, the one or more processors are configured to scan only rows of a base table corresponding to the identified invalidated blocks of the columnar cache.

The row store scan is a bitmap scan; and wherein in executing the one or more second operations in accordance with the row store scan, the one or more processors are configured to generate a bitmap of respective rows of a base table corresponding to the identified invalidated blocks of the columnar cache.

In generating the hybrid query execution plan, the one or more processors are configured to: generate a first data structure of nodes and directed links for the first sub-execution plan and a second data structure of nodes and directed links for the second sub-execution plan, wherein each node of a data structure represents one or more respective operations of a sub-execution plan, each directed link connecting a respective first node to a respective second node, the respective first node representing one or more first node operations performed before one or more second node operations represented by the respective second node during execution of the sub-execution plan, and generate a third data structure of nodes and directed links, including the first and second data structure connected by a root node, the root node representing one or more operations, which when executed by the one or more processors, cause the one or more processors to execute either the first sub-execution plan or the second sub-execution plan based on whether a current block of data scanned by the one or more processors while executing the query is a valid or invalidated block.

In generating the hybrid query execution plan, the one or more processors are configured to select the hybrid query execution plan from a plurality of candidate query execution plans based on an estimated number of invalidated blocks in the columnar cache.

DETAILED DESCRIPTION

Overview

Figure 1:
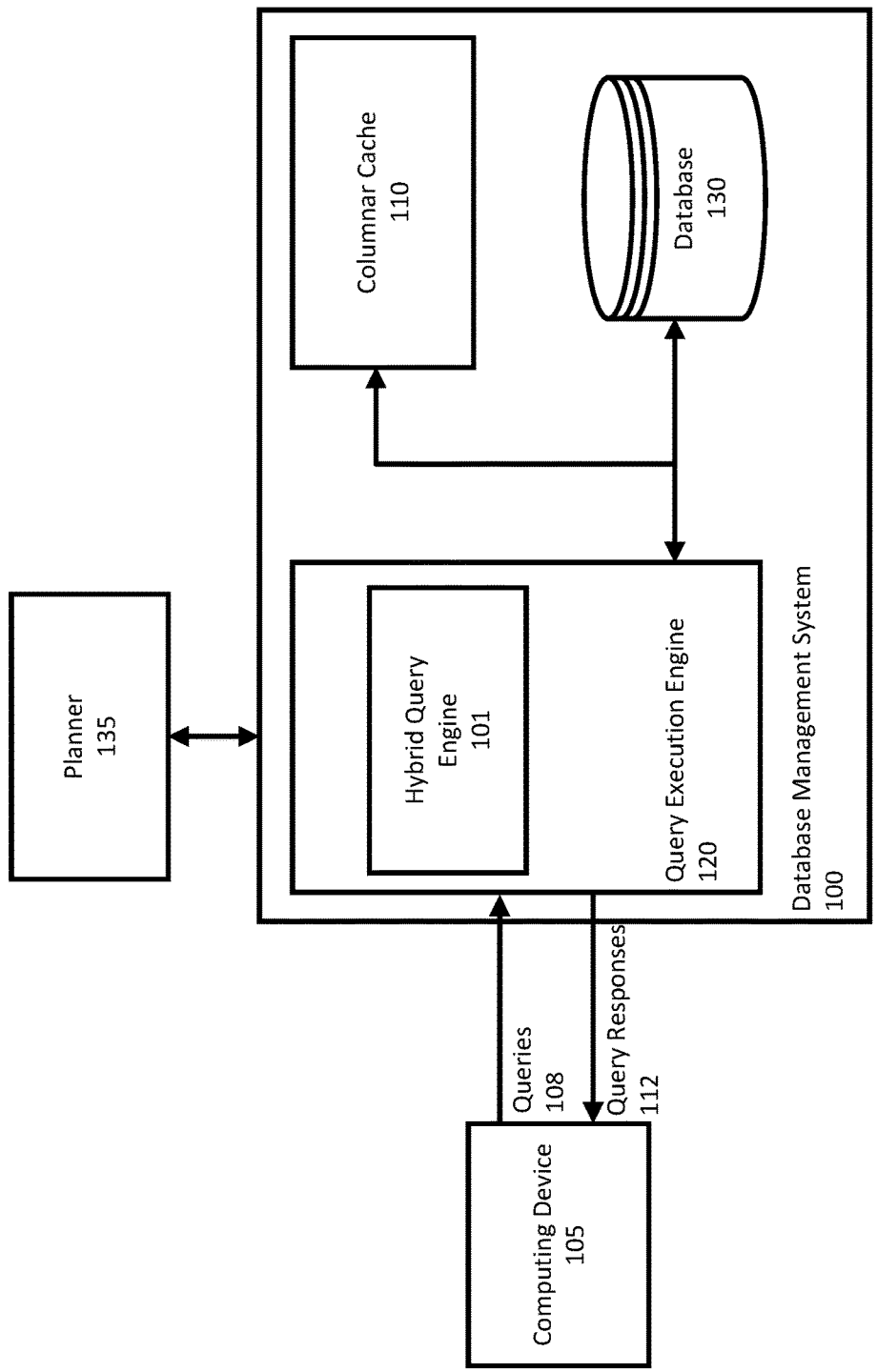
FIG. 1 is a block diagram of an example database management system configured to generate hybrid query execution plans, according to aspects of the disclosure.

Aspects of the disclosure are directed to generating and executing hybrid query execution plans for a database management system (DBMS) implementing a columnar cache. A columnar cache is a cache of attributes from tables of a database of the DBMS. Attributes, such as columns, are cached physically in column-major format. For retrieving and sending data to store in the columnar cache, the database management system stores the columns in one or more columnar units (CUs). A columnar unit is a virtual horizontal partitioning of row-major data.

The DBMS can scan the contents of a columnar cache using a columnar cache scan. A columnar cache scan may be an optimized operation, tailored in accordance with the predetermined arrangement of column data in the cache in column-major format. A columnar cache scan is an optimized form of scan to scan the cached data in columnar format. The invalidated blocks are modified so the data of the invalidated blocks stored in the columnar cache are not the latest data. Therefore, for invalidated blocks, during the query execution, the DBMS scans the base table to find the latest data.

As a result of the data blocks stored in the columnar cache becoming invalid due to the modification of data in the corresponding base table, the columnar cache scan may be unable to scan invalidated blocks in cached columnar units. One or more blocks of cached data may be invalidated, for example, because the base table in the database from which the blocks were cached has been updated since caching the blocks. There may be two copies of the invalidated blocks. The copy stored in the columnar cache contains stale data and the copy stored in the base table contains the latest data. In order to answer a query when the cache contains invalidated blocks, the DBMS scans the base table to retrieve the latest data for the invalidated blocks.

To scan invalidated blocks of the columnar cache while still exploiting optimized columnar cache scan operations, the DBMS generates and executes a hybrid query execution plan. A query execution plan represents the operations and order in which the operations are to be performed by the DBMS to correctly execute the query. A hybrid query execution plan includes a sub-execution plan for scanning invalidated blocks, and a sub-execution plan for scanning valid blocks. The DBMS scans valid blocks according to a sub-execution plan including a columnar cache scan or other scan operation in which the DBMS is configured to scan cached column data. Then, the DBMS scans invalidated blocks according to a sub-execution plan for a modified row store operation, such as an index scan, an index only scan, a sequential scan, or a bitmap scan.

After receiving and parsing a query, the DBMS generates a query execution plan. The query execution plan includes a root-level append node, representing one or more operations performed by the DBMS for joining the operations represented in each sub-execution plan. Each sub-execution plan represents operations for performing a scan on either the cached data or on base tables of the database from which the data is cached. The DBMS performs the sub-execution plan according to the columnar cache scan first, to scan valid blocks and to identify invalidated blocks in the cache. Then, the DBMS performs the operations of the sub-execution plan for retrieving the updated data from the base table of the identified invalidated blocks.

The DBMS can execute row store scans modified to scan only rows of the database corresponding to invalidated blocks in the columnar cache. To do so, before scanning each row in a table targeted by a received query, the DBMS can determine whether the row identifier for the current row matches a row identifier for an invalidated block in the columnar cache. If the row identifiers match, then the DBMS scans the current row as part of the row store scan. Otherwise, the DBMS skips over to the next row.

According to some aspects of the disclosure, the DBMS is configured to estimate the performance of executing a query according to different candidate query execution plans and select a plan for executing a received query.

The DBMS can apply a cost-based process to decide whether to use a hybrid plan or default to another plan, for example using row-store scans. If the cost of executing a hybrid plan is higher than the row store scan, the DBMS directly uses the row store scan to scan the base table. The DBMS as described herein has the additional option of using a hybrid query plan, as described herein. Cost can be measured, for example, in the total amount of time to execute a query according to each plan, and/or the number of processing cycles or operations to execute as part of resolving the query according to each plan.

Aspects of the disclosure provide for a number of technical advantages. Hybrid execution plans as described herein allow for optimized read and write operations to be performed on a columnar cache having invalidated blocks. Hybrid execution plans allow for flexible implementation of a variety of different scans on different types of queried data. The DBMS can generate a hybrid query execution plan that can be modified to substitute different types of scanning operations based on the nature of data scanned in a cache, for example invalidated versus valid cached blocks. The hybrid query execution plan allows for columnar-aware operations to be developed to further improve data retrieval and processing from a columnar cache.

The hybrid query plan and the DBMS as described herein provide a mechanism for separately optimizing the execution of a query according to different types of scans across both cache and disk storage. The hybrid query plan as described herein provides for separate execution paths, which can be separately optimized and adjusted in accordance with different processes for row-store and cache scans, respectively.

Example Systems

FIG. 1 is a block diagram of an example database management system (DBMS) 100 configured to generate hybrid query execution plans, according to aspects of the disclosure. The DBMS 100 can include a hybrid query engine 101, a columnar cache 110, a query execution engine 120, and a database 130.

The DBMS 100 is configured to receive queries, such as queries 108 from computing device 105, and resolve queries by providing responses, such as query responses 112. A query response can include one or more rows or columns— or portions of one or more rows or columns—of one or more tables of the database 130. Before providing the query response, the DBMS 100 can optionally process the data, for example by sorting the rows of the response. Operations for processing the query response can be provided as part of a received query, and/or be part of a predetermined pipeline that the DBMS 100 is configured to execute as part of resolving a query.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 is configured to automatically communicate with the DBMS 100, for example as part of an executed program by the computing device 105.

In some examples, the DBMS 100 can be a hybrid transactional and analytical processing system (HTAP). An HTAP system is a database management system configured to perform both online transaction processing (OTAP) and online analytical processing (OLAP). OTAP systems are configured to coordinate and execute transactions between communicating computing devices. Transactions are recorded and updated in a corresponding database managed by an OTAP system. OLAP systems are configured to receive and resolve queries to a database used as part of analysis of data stored in the database. OLAP and OTAP systems are separately optimized for their respective use cases, with OLAP systems generally optimized for read-only access of data, and OTAP systems optimized for read and write access of queried data.

To improve the performance of query resolution, the DBMS 100 can implement the columnar cache 110. Queries to OLAP systems and HTAP systems supporting OLAP may include requests for data referenced by columns of tables in the database, as opposed to references to individual rows, which is more common in OTAP. To speed up resolution of queries by column, the DBMS 100 can implement the columnar cache 110.

The columnar cache 110 is implemented asynchronously, meaning that occasionally the columnar cache 110 will contain stale data, referred to as invalidated blocks. At least for some applications, such as HTAP systems, the system should answer queries and at the same time accept updates to base tables from which data is cached. Hybrid query execution as described herein allows for the use of asynchronous columnar caches, by allowing for the execution of queries for which data is retrieved from both the columnar cache 110 and the database 130.

Figure 2:
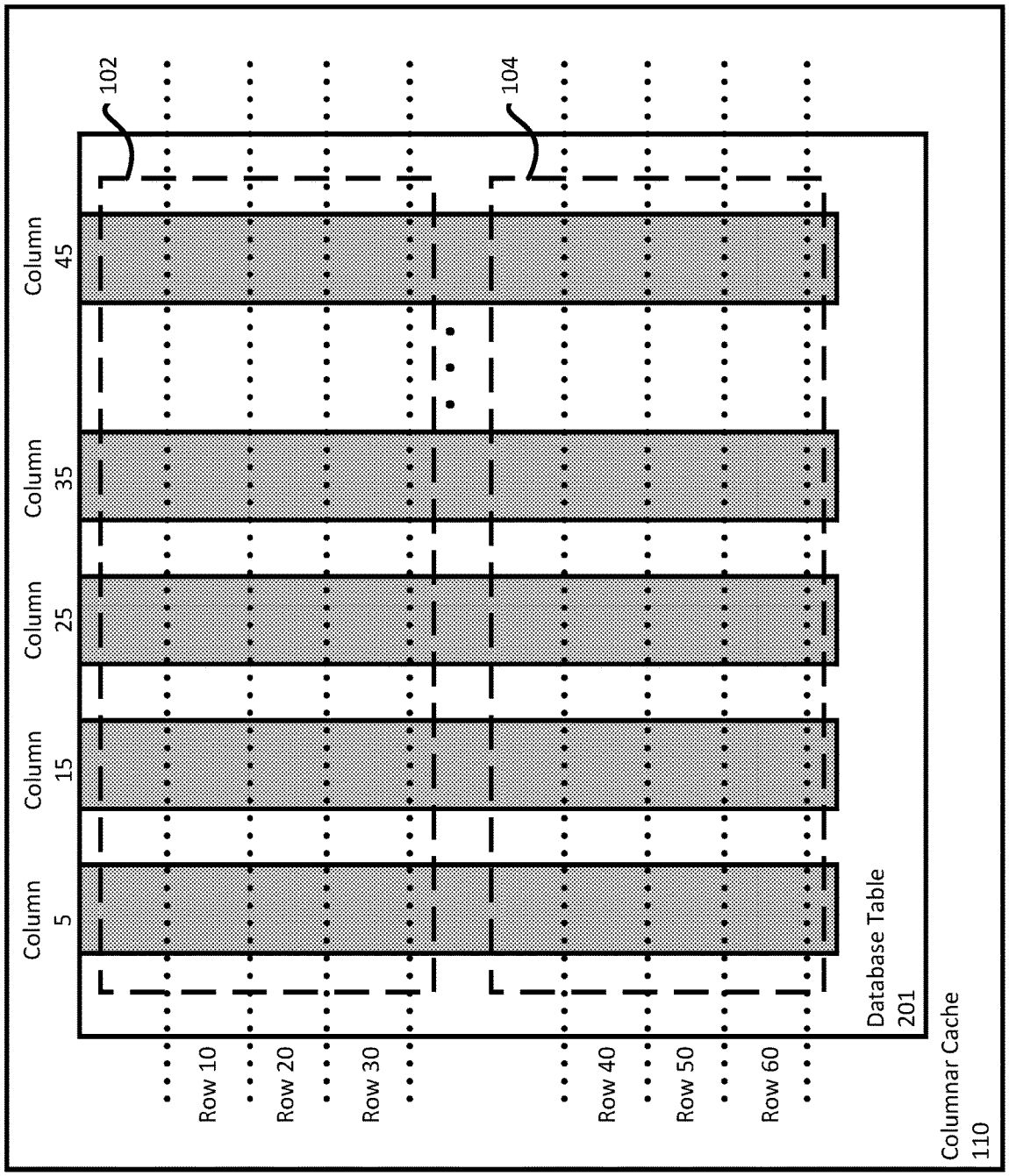
FIG. 2 is a block diagram of an example columnar cache with cached data.

FIG. 2 is a block diagram of the columnar cache 110 with cached data. In FIG. 2, the columnar cache 110 is shown as caching portions of a database table 201. Columns 5, 15, 25, and 45 in the columnar cache 110 can be referenced using a respective columnar unit index and a row index. Each columnar unit 102, 104 has a respective index. Within each columnar unit, each row of the columnar unit has a respective row index. For example, columnar unit 102 and columnar unit 104 have respective columnar unit indices, for example 102 and 104. Each row, such as row 10, row 20, and row 30, of columnar unit 102 can be referenced according to a respective row index. Similarly rows 40, 50, and 60 can be referenced according to a respective row index. The size of each columnar unit can be measured in blocks of data. The number of blocks for a columnar unit can vary from implementation-to-implementation.

The columnar cache 110 can include any of a variety of different types of memory devices used for caching data, such as main memory, on a solid-state drive, or other types of memory for quickly reading and writing data, etc.

Returning to FIG. 1, the hybrid query engine 101 is configured to generate query execution plans for executing received queries 108.

The hybrid query engine 101 is configured to generate different types of plans, according to various optimization or performance enhancing processes. In some examples, the hybrid query engine 101 can receive input specifying how query execution plans should be generated, and can also generate plans for inspection, for example by a user of the DBMS 100. The hybrid query engine 101 can, in some examples, receive additional input to modify an existing query execution plan, for example in response to use case-specific requirements in executing a received query.

The hybrid query engine 101 can receive input queries, parse the queries to identify one or more operators and conditions for applying those operators, and generate a data structure representing an ordered list of operations for the query execution engine 120 to perform to execute the query. A hybrid query execution plan refers to a combination of two or more query execution plans for querying data stored in the columnar cache 110.

In some examples, the system 100, rather than generating a hybrid query plan as described herein, receives a hybrid query plan for execution, generated by a planner 135. The planner 135 can be configured to generate hybrid query execution plans as described herein, in addition to or as an alternative to other plans or access paths using other types of scans, such as sequential scan, index scan, index-only scan, bitmap scan, etc. The planner 135 in some examples is part of the DBMS 100, while in other examples it is implemented on separate one or more devices in communication with the DBMS 100. The received plan can be executed by the hybrid query engine 101.

Figure 3:
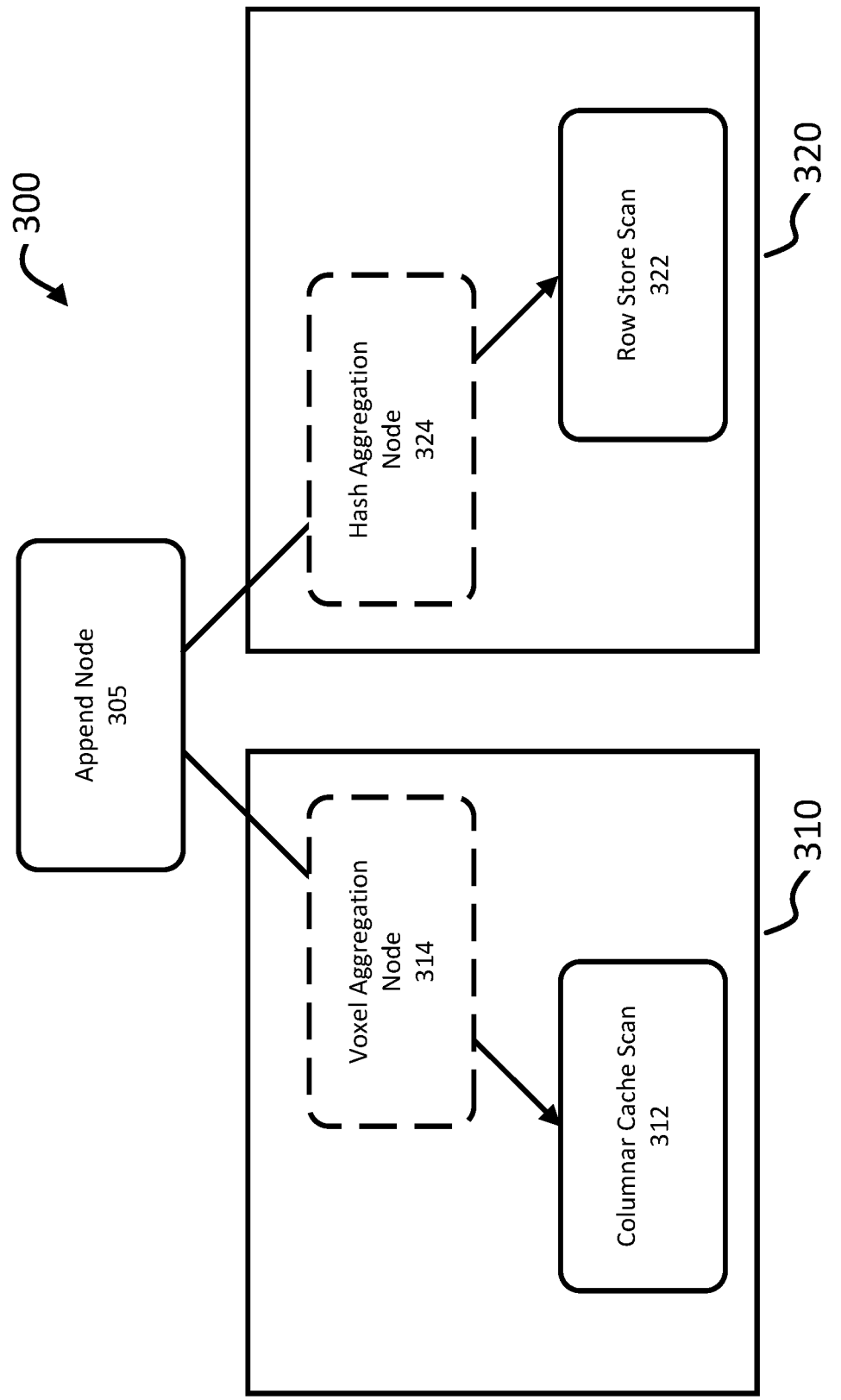
FIG. 3 illustrates an example hybrid query execution plan.

FIG. 3 illustrates an example hybrid query execution plan ("hybrid plan") 300. The hybrid plan 300 includes an append node 305, a columnar cache scan sub-execution plan 310, and a row store scan sub-execution plan 320.

The hybrid plan 300 can be a directed graph of nodes representing different operations to be performed by the DBMS 100 as part of executing the query. The query execution plan can also be represented as an ordered list or array of operations, based on the order in which the operations of the plan must be executed to correctly execute the received and parsed query. Each operation of the execution plan corresponds to an execution step. One or more operations are performed at each execution step of the plan, from a start step to an end step. A query execution plan can represent one or more child operations that the DBMS must perform before the operation—called the parent operation—is performed. Child operations can include one or more child operations of their own.

The sub-execution plan 310 includes a columnar cache scan node 312 and optionally (as indicated by the dashed outline) a voxel aggregation node 314. The columnar cache scan node 312 represents one or more operations for scanning a columnar cache by the DBMS 100. During a columnar cache scan, the DBMS reads some or all of the cached data to retrieve data responsive to conditions in a received query. Conditions for how the scan is performed can be specified as parameters in the received query for which the plan is generated.

The columnar cache scan can be a specialized operation for scanning columnar caches, such as the columnar cache 110, in which the cached data is stored physically in column-major format but represented logically in row-major format. During a columnar cache scan, the DBMS 100 translates columns of cached data from column-major to row-major format. The translation incurs a computational penalty, for example a number of processing cycles per translation. For invalidated blocks, the computational cost to translate the data is a waste, as the cached data is outdated. Aspects of the disclosure provide for handling the presence of invalidated blocks through the hybrid plan generated by the DBMS. The DBMS can continue to perform the optimized columnar cache scan for valid blocks, identify invalidated blocks during the scan, and apply a scan more suited for retrieving data from the base table(s) of invalidated blocks. The columnar cache scan operation represented by the node 312 can be any of a variety of different types of scans for scanning the columnar cache, such as scans modified from existing scans, or scans that include filtering row data before returning cached column data.

Sub-execution plan 320 can include operations for performing a row store scan on base tables of invalidated blocks in the columnar cache 110. Example types of row store scans include sequential scan, index scan, index-only scan, and bitmap scan. For each type of implemented scan, the DBMS 100 is configured to perform modified variants of row store scans to scan only rows of base tables corresponding to invalidated blocks, identified during the columnar cache scan when sub-execution plan 310 is executed. The type of row store scan represented in the hybrid query execution plan can be selected automatically or based on user input. For example, the hybrid query engine 101 can be configured to process a received query and select a row store scan over other candidate row store scans, based on the predicted performance of the selected scan over the other candidates. In other examples, the hybrid query engine 101 can receive parameters specifying a particular row store scan to perform as part of executing the received query.

A sequential scan is a scan on each row of a table targeted by a received query. When the hybrid query engine 101 generates a hybrid query plan with a sequential scan as the row store scan, the hybrid query engine 101 includes modified operations for scanning only blocks of the targeted table corresponding to invalidated blocks in the columnar cache 110, instead of scanning each row of the table. Because a columnar cache scan is performed prior to the sequential scan in the hybrid query plan, scanning the entire table is unnecessary and wasteful in terms of compute and memory resources, as the data has already been retrieved from the valid blocks in the columnar cache 110 when the sub-execution plan 310 was executed by the DBMS 100.

An index scan is a scan on rows of an indexed table based on a range of indices specified in a query. When the hybrid query engine 101 generates a hybrid query plan with an index scan as the row store scan, the query execution engine 120 includes modified operations for checking, before scanning the row at each index, whether the identifier for the row corresponds to a base row identifier for an invalidated block in the columnar cache 110. If so, the DBMS 100 scans the row at the current index. Otherwise, the DBMS 100 skips to the next index. Performing the check before scanning the row prevents unnecessary scanning, as valid blocks from the cache have already been retrieved prior to performing the row store scan, leaving only rows of base tables for invalidated blocks to be scanned.

A bitmap scan is a scan in which the target indices are generated as a bitmap. Then, the DBMS scans the bitmap to find a matching row, subject to the conditions or parameters of the scan, for example based on a corresponding predicate of the input query. When the hybrid query engine 101 generates a hybrid query plan with a bitmap scan as the row store scan, the hybrid query engine 101 includes modified operations for generating a respective bitmap data structure, such as a btree index, hash index, brin index, gist index, gin index, spgist index, etc., to create a bitmap only for rows of the base table for invalidated blocks identified in the columnar cache 110 during the columnar cache scan.

In some implementations, the DBMS 100 executes a hybrid query execution plan according to a parallel processing pattern. For example, the DBMS 100 can spawn several worker processes or processes configured to execute portions of a query according to a hybrid query execution plan. Executing a portion of a query can refer to performing some, but not all operations as part of a query execution plan to resolve a query and return the corresponding results. Executing a portion of a query can also refer to performing the same operations of a query execution plan across multiple worker processes, but only on subsets of data referenced in a query received by the DBMS 100.

As a preliminary step, the DBMS 100 can allocate resources to several processes, which may correspond to physical cores of one or more processors implementing the DBMS 100 and/or refer to processes defined in software and part of an instance of the DBMS 100 executed as part of a process. The DBMS 100 can receive a query and generate a query execution plan for the received query. A leader process can be allocated and configured to assign portions of the query to multiple different worker processes. The worker processes can be configured to resolve their portion of the query based on an assignment by the leader thread and return their results to the leader.

When doing a parallel row store scan, the leader thread synchronizes all the worker processes to generate unified invalidated blocks that contain all invalidated blocks. For example, in index scan, each worker thread handles an index page and checks the base table row identifier against the unified invalidated blocks. As another example, in bitmap scan, a leader thread scans the whole index and checks the row identifier for each indexed row against the unified blocks to create a bitmap. Each worker thread handles a part of the bitmap and checks the row identifier against the unified invalidated blocks to retrieve rows corresponding to the base table of the invalidated blocks.

Sub-execution plans 310 and 320 can include one or more nodes representing operations in addition to scan operations. Example nodes include voxel aggregation node 314 and hash aggregation node 324. The additional nodes can represent additional operations for processing data retrieved as part of performing a scan for a respective sub-execution plan. By generating a hybrid execution plan separating columnar cache scan from row store scans, respective operations for either scan type can be easily integrated to existing query execution plans. As a result, subsequent improvements to the DBMS 100 scanning valid and invalidated blocks of the columnar cache 110 can be implemented more easily, at least because of the separation of the respective scans by sub-execution plan.

For example, results of the columnar cache scan 312 can be aggregated according to a voxel aggregation operation represented by voxel aggregation node 314. During voxel aggregation, the DBMS 100 performs a vectorized aggregate on columnar cache data. In the sub-execution plan 320, the DBMS 100 performs a hash aggregation on rows of base tables for invalidated blocks, represented by a hash aggregation node 324. FIG. 3 illustrates how different operators can be pushed through the append node 305 to handle the scanning results of different portions of data, i.e., valid blocks from the columnar cache 110 and blocks from base tables of invalidated blocks of the columnar cache 110. The DBMS 100 can be incrementally improved for better scan and retrieval of cached data and/or data from a stored table of a database. Incremental improvements can be represented as new operations performed, which can be included in the corresponding sub-execution plan of a hybrid query execution plan, depending on whether the operations improve columnar cache scanning or row store scanning.

The operator pushdown by the append node 305 as shown in FIG. 3 shows the aggregation nodes 314, 324, have been pushed down to the top of the scan nodes 312, 322. Different aggregation operations can be applied to different scan operations. Without the hybrid plan, it is difficult or impossible to perform aggregation of different sources of data according to different aggregation operators.

In some examples, the DBMS estimates the cost of a hybrid query execution plan with other access paths, for example using sequential scan, index scan, index-only scan, and/or bitmap scan (without columnar cache scanning) The approach with the lowest cost is selected by the DBMS for executing an input query. The cost can be based, for example, on the number or estimated number of valid and invalidated blocks. In addition, or alternatively, the cost can be based on the execution cost for performing a particular type of scan, for example columnar cache scan versus sequential scan, index scan, index-only scan and/or bitmap scan. The availability of hybrid query plans as described herein introduces a new dimension for performance improvement and can be implemented as an additional approach which on average improves performance of the DBMS 100 across different workloads, versus systems in which the hybrid query plan as described herein is not available.

Example Methods

Figure 4:
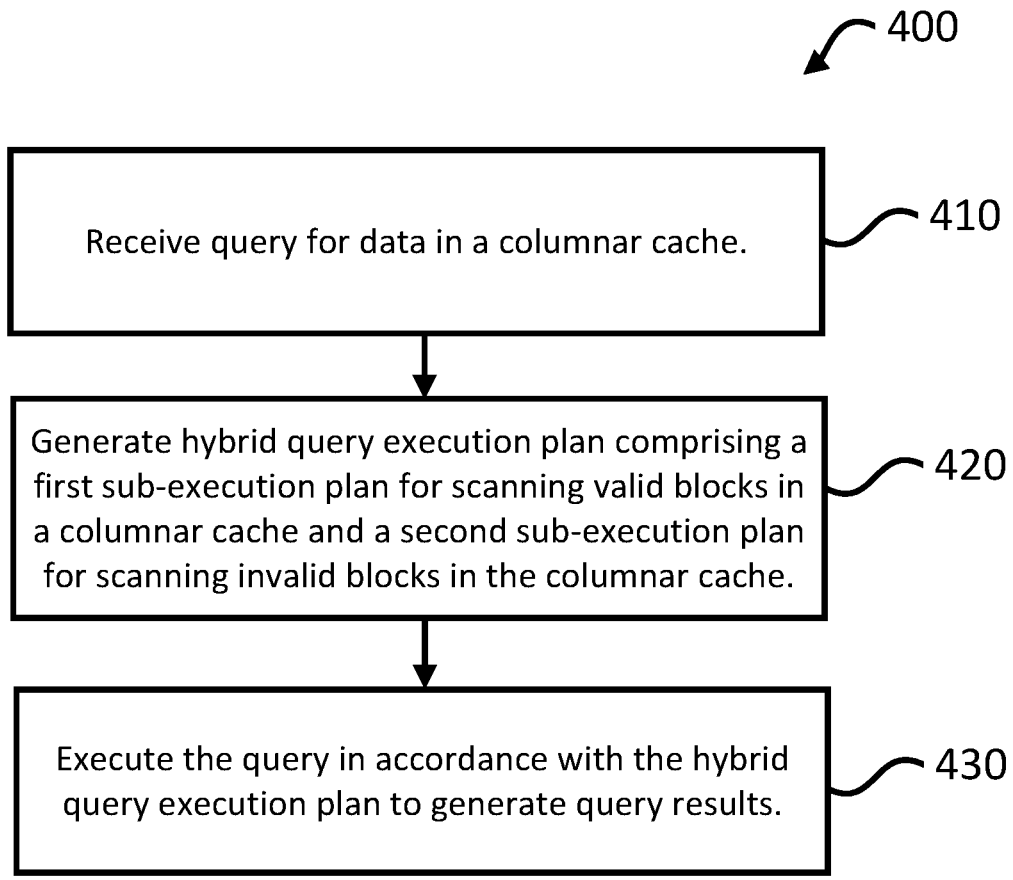
FIG. 4 is a flowchart of an example process for resolving a query using a hybrid query execution plan, according to aspects of the disclosure.

FIG. 4 is a flowchart of an example process for resolving a query using a hybrid query execution plan, according to aspects of the disclosure.

The DBMS receives a query for data in a columnar cache, according to block 410. The query may explicitly specify to retrieve data from the cache, or the DBMS may determine that some or all of the data queried is in a columnar cache managed by the DBMS.

The DBMS generates a hybrid query execution plan including a first sub-execution plan for scanning valid blocks in the columnar cache, and a second sub-execution plan for scanning invalidated blocks in the columnar cache, according to block 420. The DBMS can generate the hybrid query execution plan, for example, according to the process 500. As shown with reference to FIG. 3, the hybrid query execution plan can be represented as a directed graph of operations, with separate sub-execution plans appended to a root node. The root node can represent operations performed during query execution for combining query results from executing the separate sub-execution plans.

Figure 5:
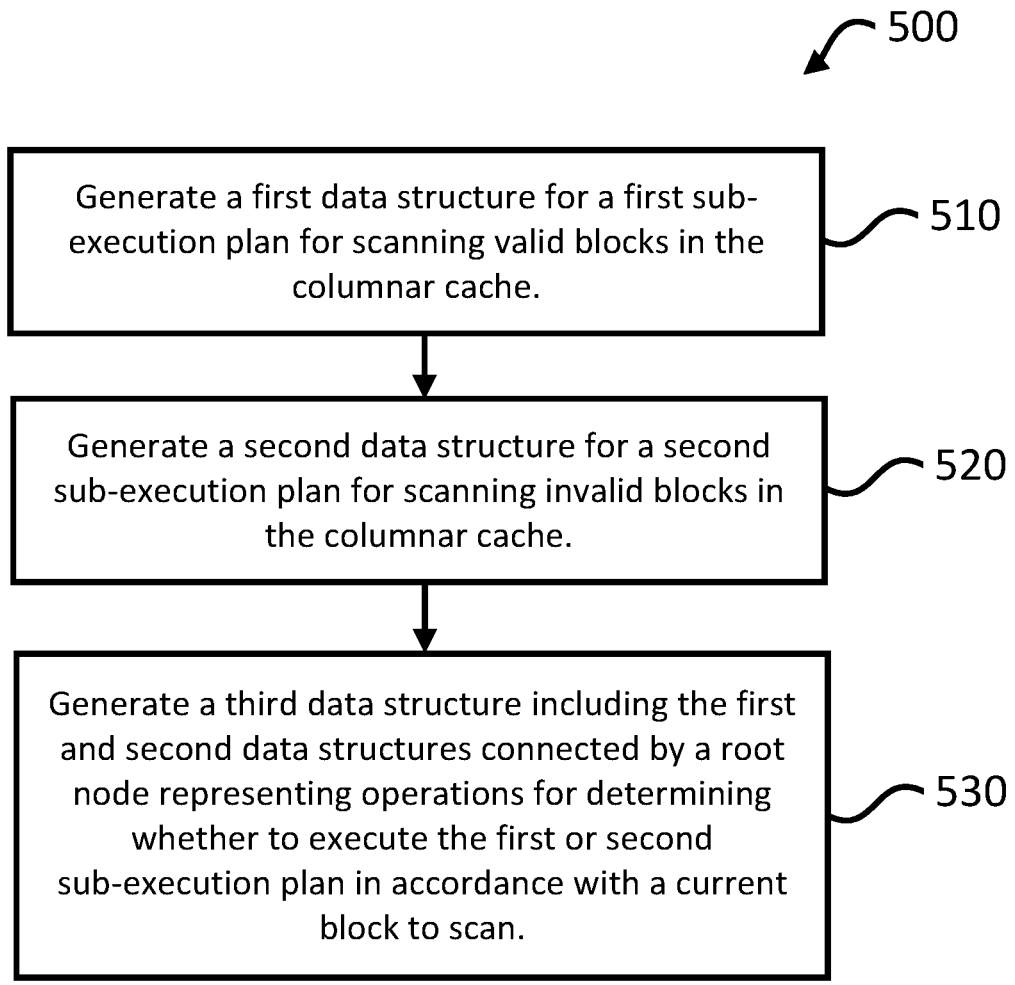
FIG. 5 is a flowchart of an example process for generating a hybrid query execution plan, according to aspects of the disclosure.

The DBMS executes the query in accordance with the hybrid query execution plan, to generate corresponding query results, according to block 430. In some examples, the process 400 ends without executing the query. In some examples, the DBMS generates a query execution plan for a query and stores the plan to execute the query at a different time. The DBMS executes a sub-execution plan for scanning valid blocks first, before executing the sub-execution for scanning invalidated FIG. 5 is a flowchart of an example process 500 for generating a hybrid query execution plan, according to aspects of the disclosure.

The DBMS generates a first data structure for a first sub-execution plan for scanning valid blocks in the columnar cache, according to block 510. The sub-execution plan can include performing, by the DBMS, operations for a columnar cache scan, which may be performed in accordance with the physical column-major format of the cache, as described herein with reference to FIG. 2.

The DBMS generates a second data structure for a second sub-execution plan for scanning invalidated blocks in the columnar cache, according to block 520. The second sub-execution plan can include performing, by the DBMS, a row store scan, such as an index scan, index only scan, bitmap scan, etc., of tables in the database from which blocks were originally retrieved and cached from before becoming invalid, for example due to updates to the contents of the tables.

The DBMS generates a third data structure including the first and second data structure, according to block 530. The third data structure represents the hybrid query execution plan, connecting both the first and second sub-execution plans by a root node. The root node can represent operations for combining the results of executing the first and second sub-execution plans. For example, valid blocks are scanned by the DBMS according to the first sub-execution plan. After the valid blocks are scanned, the DBMS scans the remaining invalidated blocks according to the second sub-execution plan, which is then scanned according to the second sub-execution plan. The root node, the results of querying the valid and invalidated blocks are combined and returned as query results.

Example Computing Environment

Figure 6:
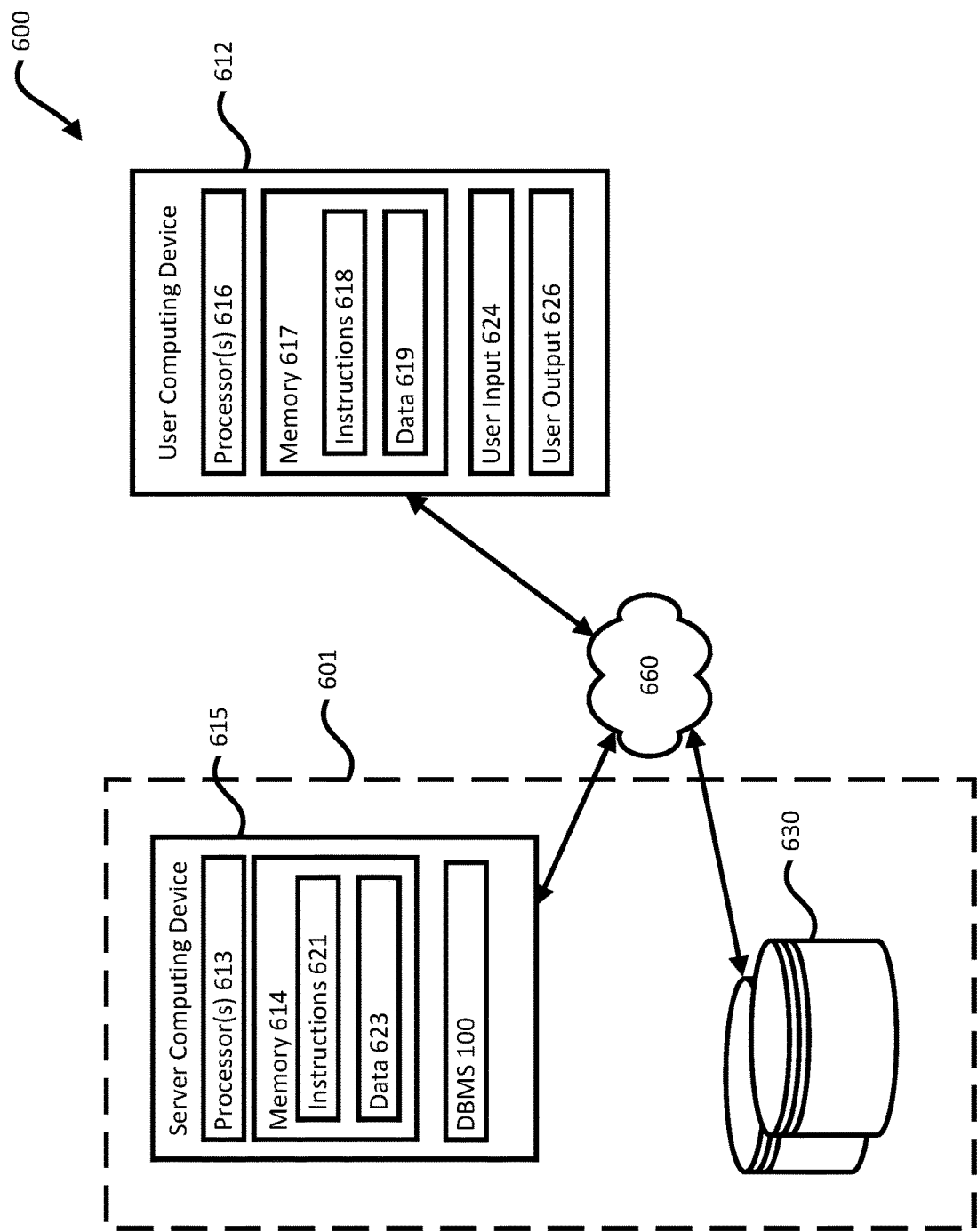
FIG. 6 is a block diagram of an example computing environment implementing the database management system, according to aspects of the disclosure.

FIG. 6 is a block diagram of an example computing environment 600 implementing the database management system 100, according to aspects of the disclosure.

The DBMS 100 can be implemented on one or more devices having one or more processors in one or more locations, such as in server computing device 615. User computing device 612 and the server computing device 615 can be communicatively coupled to one or more storage device(s) 630 over a network 660. The server computing device 615 and storage device(s) 630 can form part of a computing platform 601. The computing platform 601 can be a cloud computing platform, offering a variety of different services, for example for providing compute and storage resources to users of the platform.

The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, cause the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 616 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
one or more hardware processors configured to:
receive a query for data in a columnar cache, the columnar cache comprising one or more columns of data of tables of a database, each column comprising one or more blocks of data;
generate, after receiving the query, a hybrid query execution plan comprising:
a first data structure of nodes and directed links for a first sub-execution plan, wherein the first sub-execution plan comprises one or more first operations to scan valid blocks in the columnar cache; and
a second data structure of nodes and directed links for a second sub-execution plan, wherein the second sub-execution plan comprising one or more second operations to scan invalidated blocks in the columnar cache,
wherein each node of the first and second data structures represents one or more respective operations of a sub-execution plan and each directed link of the first and second data structures connects a respective first node to a respective second node, the respective first node representing one or more first node operations performed before one or more second node operations represented by the respective second node during execution of the sub-execution plan, and
execute the received query in the columnar cache based on the generated hybrid query execution plan.

2. The system of claim 1, wherein the one or more processors are further configured to:
execute the one or more first operations to scan valid blocks in the columnar cache, wherein while executing the one or more first operations, identify invalidated blocks in the columnar cache; and
execute the one or more second operations to scan only rows of a base table corresponding to the identified invalidated blocks.

3. The system of claim 2, wherein the one or more first operations comprise operations to perform a columnar cache scan when executed by the one or more processors, and
wherein the one or more second operations comprise operations to perform a row store scan when executed by the one or more processors.

4. The system of claim 3, wherein the row store scan is one of a sequential scan, an index scan, an index only scan, or a bitmap scan and, when the row store scan is executed only rows of a base table corresponding to identified invalidated blocks are scanned.

5. The system of claim 4, wherein the row store scan is an index scan, and each invalidated block comprises a respective row identifier identifying a row in a table of the database of which the block is stored and the one or more processors are further configured to:
scan, in executing the one or more second operations in accordance with the row store scan to scan only the identified invalidated blocks, each of one or more rows of a table of the database after determining that a respective row identifier for the row matches a respective row identifier for at least one of the invalidated blocks.

6. The system of claim 4, wherein the row store scan is a sequential scan and the one or more processors are further configured to:
scan, in executing the one or more second operations in accordance with the row store scan, only rows of a base table corresponding to the identified invalidated blocks of the columnar cache.

7. The system of claim 4, wherein the row store scan is a bitmap scan, and the one or more processors are further configured to:
generate, in executing the one or more second operations in accordance with the row store scan, a bitmap of respective rows of a base table corresponding to the identified invalidated blocks of the columnar cache.

8. The system of claim 1, wherein in generating the hybrid query execution plan, the one or more processors are further configured to:
generate a third data structure of nodes and directed links, comprising the first and second data structure connected by a root node, the root node representing one or more operations, wherein the third data structure of nodes and directed links cause the one or more processors to execute either the first sub-execution plan or the second sub-execution plan based on whether a current block of data scanned by the one or more processors while executing the query is a valid or invalidated block.

9. The system of claim 1, wherein in generating the hybrid query execution plan, the one or more processors are further configured to select the hybrid query execution plan from a plurality of candidate query execution plans based on an estimated number of invalidated blocks in the columnar cache.

10. A computer-implemented method comprising:
receiving, by one or more processors, a query for data in a columnar cache, the columnar cache1 comprising one or more columns of data of tables of a database, each column comprising one or more blocks of data;
generating, by one or more processors, after receiving the query, a hybrid query execution plan comprising:
a first data structure of nodes and directed links for a first sub-execution plan, wherein the first sub-execution plan comprises one or more first operations to scan valid blocks in the columnar cache; and
a second data structure of nodes and directed links for a second sub-execution plan, wherein the second sub-execution plan comprising one or more second operations to scan invalidated blocks in the columnar cache,
wherein each node of the first and second data structures represents one or more respective operations of a sub-execution plan and each directed link of the first and second data structures connects a respective first node to a respective second node, and the respective first node represents one or more first node operations performed before one or more second node operations represented by the respective second node during execution of the sub-execution plan, and executing the received query in the columnar cache based on the generated hybrid query execution plan.

11. The method of claim 10, further comprising:
executing the one or more first operations to scan valid blocks in the columnar cache, wherein while executing the one or more first operations, identify invalidated blocks in the columnar cache; and
executing the one or more second operations to scan only rows of a base table corresponding to the identified invalidated blocks.

12. The method of claim 11, wherein the one or more first operations comprise operations to perform a columnar cache scan, and
wherein the one or more second operations comprise operations to perform a row store scan.

13. The method of claim 12, wherein the row store scan is one of a sequential scan, an index scan, an index only scan, or a bitmap scan, and when the row store scan is executed only rows of a base table corresponding to identified invalidated blocks are scanned.

14. The method of claim 13, wherein the row store scan is an index scan, and each invalidated block comprises a respective row identifier identifying a row in a table of the database of which the block is stored, the method further comprising:
scanning, in executing the one or more second operations in accordance with the row store scan to scan only the identified invalidated blocks, each of one or more rows of a table of the database after determining that a respective row identifier for the row matches a respective row identifier for at least one of the invalidated blocks.

15. The method of claim 13, wherein the row store scan is a bitmap scan, the method further comprising:
generating, in executing the one or more second operations in accordance with the row store scan, a bitmap of respective rows of a base table corresponding to the identified invalidated blocks of the columnar cache.

16. The method of claim 10, the method further comprising:
in generating the hybrid query execution plan, generating a third data structure of nodes and directed links, comprising the first and second data structure connected by a root node, the root node representing one or more operations, wherein the third data structure of nodes and directed links cause the one or more processors to execute either the first sub-execution plan or the second sub-execution plan based on whether a current block of data scanned by the one or more processors while executing the query is a valid or invalidated block.

* * * * *